United States Patent
Kim et al.

(10) Patent No.: US 10,211,468 B2
(45) Date of Patent: Feb. 19, 2019

(54) DEVICE AND METHOD FOR MANUFACTURING MEMBRANE-ELECTRODE ASSEMBLY OF FUEL CELL

(71) Applicant: Hyundai Motor Company, Seoul (KR)

(72) Inventors: MinJin Kim, Seoul (KR); Jaeseung Lee, Gyeonggi-do (KR); Woojin Lee, Seoul (KR); Seokjung Park, Seoul (KR); Ki Sub Lee, Gyeonggi-do (KR); Yongmin Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/354,939

(22) Filed: Nov. 17, 2016

(65) Prior Publication Data
US 2017/0309930 A1  Oct. 26, 2017

(30) Foreign Application Priority Data
Apr. 25, 2016  (KR) ......................... 10-2016-0050211

(51) Int. Cl.
*B29C 53/00*  (2006.01)
*B29C 53/36*  (2006.01)
(Continued)

(52) U.S. Cl.
CPC ........... *H01M 8/0297* (2013.01); *B29C 53/56* (2013.01); *B29C 53/8016* (2013.01);
(Continued)

(58) Field of Classification Search
CPC ....... H01M 2008/1095; H01M 8/0297; H01M 8/1004; B32B 17/00; B32B 2037/268;
(Continued)

(56) References Cited

U.S. PATENT DOCUMENTS

2007/0129237 A1* 6/2007 Kadotani ................ B05B 5/057
502/101
2014/0338824 A1* 11/2014 Takagi .................. B32B 38/164
156/237

FOREIGN PATENT DOCUMENTS

JP  2006-172936 A  6/2006
JP  2015-050023 A  3/2015
(Continued)

OTHER PUBLICATIONS

Office Action of KR20160050211.*
(Continued)

*Primary Examiner* — Sonya M Sengupta
(74) *Attorney, Agent, or Firm* — Mintz Levin Cohn Ferris Glovsky and Popeo, P.C.; Peter F. Corless

(57) ABSTRACT

A manufacturing device of a membrane-electrode assembly for fuel cell includes a membrane unwinder unwinding and supplying a polymer electrolyte membrane of a roll shape; a film unwinder unwinding and supplying a release film of a roll shape respectively coated with an anode catalyst electrode layer and a cathode catalyst electrode layer with a predetermined interval in an upper and lower sides of the polymer electrolyte membrane; upper and lower bonding rolls respectively disposed at the upper and lower sides of a progressing path of the polymer electrolyte membrane and the release film and pressed to an upper surface and a lower surface of the polymer electrolyte membrane; and a protection film unwinder unwinding and supplying a protection film between adhered surfaces of the release film and the upper and lower bonding rolls.

17 Claims, 6 Drawing Sheets

(51) Int. Cl.
| | |
|---|---|
| *B29C 53/56* | (2006.01) |
| *B29C 53/80* | (2006.01) |
| *B32B 17/00* | (2006.01) |
| *B32B 27/32* | (2006.01) |
| *B32B 27/36* | (2006.01) |
| *B32B 37/20* | (2006.01) |
| *B32B 37/26* | (2006.01) |
| *H01M 8/0297* | (2016.01) |
| *H01M 8/1004* | (2016.01) |
| *H01M 8/1018* | (2016.01) |

(52) U.S. Cl.
CPC ............ *B32B 17/00* (2013.01); *B32B 27/322* (2013.01); *B32B 27/36* (2013.01); *B32B 37/203* (2013.01); *B32B 37/26* (2013.01); *H01M 8/1004* (2013.01); *B29C 53/00* (2013.01); *B29C 53/36* (2013.01); *B32B 2037/268* (2013.01); *B32B 2315/08* (2013.01); *B32B 2327/18* (2013.01); *B32B 2367/00* (2013.01); *B32B 2379/08* (2013.01); *B32B 2457/18* (2013.01); *H01M 2008/1095* (2013.01); *Y02P 70/56* (2015.11)

(58) Field of Classification Search
CPC ............ B32B 2315/08; B32B 2327/18; B32B 2367/00; B32B 2379/08; B32B 2457/18; B32B 27/322; B32B 27/36; B32B 37/203; B32B 37/26; B29C 53/00; B29C 53/36; B29C 53/8016; B29C 53/56
USPC ........ 156/162, 169, 171, 184, 190, 430, 443
See application file for complete search history.

(56) References Cited

FOREIGN PATENT DOCUMENTS

| | | |
|---|---|---|
| JP | 5772813 B2 | 9/2015 |
| KR | 10-2015-0120790 A | 10/2015 |

OTHER PUBLICATIONS

English translation of EP2555291.*
English translation of JP2006172936.*
English translation of KR20150120790.*

* cited by examiner

FIG. 3

| | Without a protection film | 100um PET | 100um PTFE | 250um PET |
|---|---|---|---|---|
| Transfer pressure | 13.75MPa | 11.34MPa | 7.78MPa | 9.34MPa |
| Pressure deviation | 8.61MPa | 6.59MPa | 4.52MPa | 5.12MPa |

DEVICE AND METHOD FOR MANUFACTURING MEMBRANE-ELECTRODE ASSEMBLY OF FUEL CELL

CROSS-REFERENCE TO RELATED APPLICATION

This application claims under 35 U.S.C. § 119(a) the benefit of Korean Patent Application No. 10-2016-0050211 filed in the Korean Intellectual Property Office on Apr. 25, 2016, the entire contents of which are incorporated herein by reference.

BACKGROUND

(a) Technical Field

The present disclosure relates to a device and a method for manufacturing a membrane-electrode assembly for a fuel cell, more particularly, to the device and the method incorporating a roll process to facilitate a simple and continuous process, and ensure reliability.

(b) Description of the Related Art

A fuel cell generates electricity by an electrochemical reaction of hydrogen and oxygen.

Typically, a fuel cell is supplied with chemical reaction material from outside to promote sustainable generation without a separate charging process.

The fuel cell may be configured by disposing a separating plate (separator) at both sides via a membrane-electrode assembly (MEA), and this structure may be arranged in plural to be configured into a fuel cell stack (stack).

In particular, in the membrane-electrode assembly of the fuel cell as a triple layer structure, an anode catalyst electrode layer is formed at one surface of the polymer electrolyte membrane via the polymer electrolyte membrane, and a cathode catalyst electrode layer is formed at the other surface.

In a method for manufacturing the membrane-electrode assembly, for example, there are following known types: a direct coating method and a decal method.

For example, in the case of the decal method, the catalyst electrode layer is formed by coating and drying a catalyst slurry at a surface of a release film, the release film formed with the catalyst electrode layer is respectively deposited into both surfaces of the polymer electrolyte membrane, the catalyst electrode layer is transferred to both surfaces of the polymer electrolyte membrane to be adhered by using a roll laminating process, and the release film is removed, thereby forming the membrane-electrode assembly of the three-layered structure.

That is, in the manufacturing process of the membrane-electrode assembly using the decal method, the catalyst electrode layer of the roll type and the polymer electrolyte membrane of the roll type are continuously heat-pressed through an adhering roll of high temperature and high pressure, and the release film is removed to manufacture the membrane-electrode assembly of the three-layered structure.

As described above, in the process of manufacturing the membrane-electrode assembly of the three-layered structure by the decal method using the roll laminating process, since a manufacturing speed may be improved and a scale-up is easy, there are advantages in mass production.

However, in the decal method using the roll lamination process, in the state that the electrode film coated with each catalyst electrode layer on both sides via the electrolyte membrane interposed therebetween is positioned, since they pass between the bonding rolls of high temperature and high pressure, and the catalyst electrode layer and the electrolyte membrane are laminated in the direction that they contact each other, it is difficult to align the lamination positions of the anode catalyst electrode layer and the cathode catalyst electrode layer.

Also, in the case of using the roll laminating continuous process, an imbalance of pressure may be generated due to a slight twisting of the roll flat and a wheelbase, and an interface adhering force of the electrode and the electrolyte membrane is inadequate.

The above information disclosed in this Background section is only for enhancement of understanding of the background of the invention and therefore it may contain information that does not form the prior art that is already known in this country to a person of ordinary skill in the art.

SUMMARY

The present disclosure provides a manufacturing device and a manufacturing method of a membrane-electrode assembly for a fuel cell having uniform and excellent performance by adding a protection film between bonding rolls in a roll laminating continuous process, thus resulting in a simple and continuous process.

According to an exemplary embodiment of the present disclosure, a manufacturing device of a membrane-electrode assembly for fuel cell includes a membrane unwinder unwinding and supplying a polymer electrolyte membrane of a roll shape; a film unwinder unwinding and supplying a release film of a roll shape respectively coated with an anode catalyst electrode layer and a cathode catalyst electrode layer with a predetermined interval in an upper and lower sides of the polymer electrolyte membrane; upper and lower bonding rolls respectively disposed at the upper and lower sides of a progressing path of the polymer electrolyte membrane and the release film and pressed to an upper surface and a lower surface of the polymer electrolyte membrane; and a protection film unwinder unwinding and supplying a protection film between adhered surfaces of the release film and the upper and lower bonding rolls.

A release bar disposed at an entry side of the upper and lower bonding rolls and peeling the release film may be further included.

A membrane rewinder rolling the polymer electrolyte membrane unrolled from the membrane unwinder to be recovered; a film rewinder film rolling the release film unrolled from the unwinder; and a protection film rewinder unrolled from the protection film unwinder may be further included.

The film unwinder may include first film unwinder positioned on the polymer electrolyte membrane and unwinding and supplying a first release film and a second film unwinder positioned under the polymer electrolyte membrane and unwinding and supplying a second release film, and the protection film unwinder may include a first protection film unwinder positioned on the polymer electrolyte membrane and unwinding and supplying a first protection film and a second protection film unwinder disposed under the polymer electrolyte membrane and winding and supplying a second protection film.

The protection film may include at least one of polytetrafluoroethylene (PTFE), polyethyleneterephthalate (PET), polyimide (PI), polyethylene naphthalate (PEN), and silicon.

The protection film may include a glass fiber.

The glass fiber may be coated to the protection film.

The glass fiber may be included in the protection film as an additive.

The thickness of the protection film is about 100 to about 1000 microns.

The thickness of the protection film is about 100 to about 300 microns.

Also, according to another exemplary embodiment of the present disclosure, a manufacturing method of the membrane-electrode assembly for a fuel cell includes: unwinding, by a membrane unwinder, a polymer electrolyte membrane to be supplied to a progressing path; unwinding, by a film unwinder, a release film coated with an anode catalyst electrode layer and a cathode catalyst electrode layer with a predetermined interval, the release film being unwound to upper and lower sides of the polymer electrolyte membrane to be supplied at the same time with the supply of the polymer electrolyte membrane; unwinding a protection film, by a protection film unwinder, to the surface of the release film at the same time with the supply of the polymer electrolyte membrane and the release film; and pressing the release film and the protection film disposed via the polymer electrolyte membrane by using upper and lower bonding rolls to transfer and bond the anode catalyst electrode layer and the cathode catalyst electrode layer to the polymer electrolyte membrane.

After transferring and bonding the anode catalyst electrode layer and the cathode catalyst electrode layer to the polymer electrolyte membrane, peeling the release film at an entry side of the upper and lower bonding roll by using a release bar may be further included.

After peeling the release film, rolling the polymer electrolyte membrane bonded with the anode catalyst electrode layer and the cathode catalyst electrode layer to be recovered by using a membrane rewinder; rolling and recovering the release film by using a film rewinder; and rolling and recovering the protection film by using a protection film rewinder may be further included.

As described above, according to an exemplary embodiment of the present disclosure, by adding the protection film between the bonding roll to execute the roll laminating continuous process, the membrane-electrode assembly for the fuel cell having the uniform and excellent performance may be manufactured.

BRIEF DESCRIPTION OF THE DRAWINGS

FIG. 3 is a view showing a result measuring a surface pressure applied to a membrane-electrode assembly in a manufacturing device of a membrane-electrode assembly for a fuel cell according to a comparative example and an exemplary embodiment of the present disclosure.

DETAILED DESCRIPTION OF THE EMBODIMENTS

Figure 1:
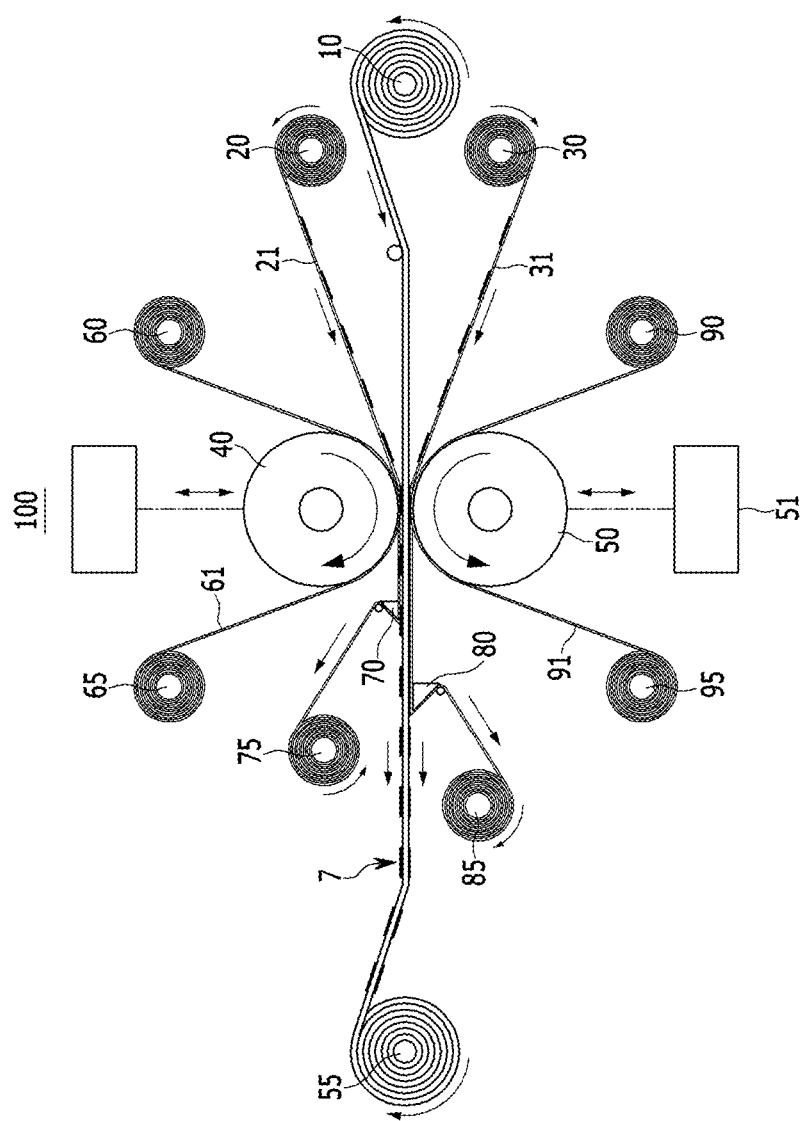
FIG. 1 is a schematic diagram of a manufacturing device of a membrane-electrode assembly for a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the invention are shown.

As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

First, a manufacturing device and a manufacturing method of a membrane-electrode assembly for a fuel cell according to an exemplary embodiment of the present disclosure will be described with reference to FIGS. 1 and 2.

Figure 2:
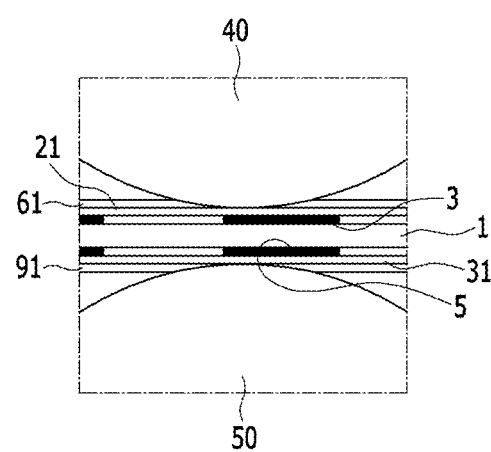
FIG. 2 is an enlarged view of a selected portion of FIG. 1.

FIG. 1 is a schematic diagram of a manufacturing device of a membrane-electrode assembly for a fuel cell according to an exemplary embodiment of the present disclosure, and FIG. 2 is an enlarged view of a selected portion of FIG. 1.

Referring to FIGS. 1 and 2, a manufacturing device 100 of a membrane-electrode assembly for a fuel cell according to an exemplary embodiment of the present disclosure may be applied to an automation system for automatically and consecutively manufacturing parts of unit fuel cells that form a fuel cell stack.

The manufacturing device 100 of the membrane-electrode assembly for the fuel cell according to the exemplary embodiment of the present disclosure bonds an anode catalyst electrode layer 3 at one surface of a polymer electrolyte membrane 1 and bonds a cathode catalyst electrode layer 5 at the other surface of the polymer electrolyte membrane 1 with the polymer electrolyte membrane 1 interposed therebetween, thereby manufacturing a membrane-electrode assembly 7 of the three-layered structure.

The manufacturing device 100 of the membrane-electrode assembly for the fuel cell coats and dries a catalyst slurry at surfaces of release films 21 and 31 to form catalyst electrode layers 3 and 5, respectively deposits the release films 21 and 31 formed with the catalyst electrode layers 3 and 5 into both surfaces of the polymer electrolyte membrane 1, and then transfers the catalyst electrode layers 3 and 5 to both surfaces of the polymer electrolyte membrane 1 by using a roll laminating process to be bonded, and the release films 21 and 31 are removed, thereby manufacturing the membrane-electrode assembly 7 of the three-layered structure.

The manufacturing device 100 of the membrane-electrode assembly for the fuel cell may be configured of a structure that the catalyst electrode layers 3 and 5 are continuously roll-laminated at both surfaces of the polymer electrolyte membrane 1 by the decal method and the positions of the catalyst electrode layers 3 and 5 are automatically aligned.

For this, the manufacturing device 100 of the membrane-electrode assembly for the fuel may include a membrane unwinder 10 and a membrane rewinder 55, film unwinders 20 and 30 and film rewinders 75 and 85, protection film unwinders 60 and 90 and protection film rewinders 65 and 95, upper and lower bonding rolls 40 and 50, and release bars 70 and 80.

Each configuration of the manufacturing device 100 of the membrane-electrode assembly for the fuel cell will be described in detail.

The membrane unwinder 10 configured to unwind the polymer electrolyte membrane 1 rolled in a roll shape to be supplied in a predetermined progressing path may unwind and supply the polymer electrolyte membrane 1 by itself driving, thereby finally unwinding and supplying the polymer electrolyte membrane 1 by a driving torque of the membrane rewinder 55 rolling the polymer electrolyte membrane 1 combined with the catalyst electrode layers 3 and 5.

The film unwinders 20 and 30 include a first film unwinder 20 and a second film unwinder 30.

The first film unwinder 20 may unwind and supply the first release film 21 of the roll shape coated with the anode catalyst electrode layer 3 in a predetermined interval to the upper side of the polymer electrolyte membrane 1.

Also, the second film unwinder 30 may unwind and supply the second release film 31 of the roll shape coated with the cathode catalyst electrode layer 5 in the predetermined interval to the lower side of the polymer electrolyte membrane 1.

Here, the first release film 21 with the state that the anode catalyst electrode layer 3 is coated on one surface may be supplied along the progressing path while the anode catalyst electrode layer 3 faces into one surface of the polymer electrolyte membrane 1.

Similarly, the second release film 31 with the state that the cathode catalyst electrode layer 5 is coated on one surface may be supplied along the progressing path while the cathode catalyst electrode layer 5 faces into one surface of the polymer electrolyte membrane 1.

The upper and lower bonding rolls 40 and 50 are configured to press the anode catalyst electrode layer 3 and the cathode catalyst electrode layer 5 of the first and second release films 21 and 31 positioned at the upper side the lower side with the polymer electrolyte membrane 1 disposed therebetween for the catalyst electrode layers 3 and 5 to be transferred and adhered to the upper and lower surfaces of the polymer electrolyte membrane 1.

The upper and lower bonding rolls 40 and 50 are respectively disposed at the upper side and lower side of the progressing path of the polymer electrolyte membrane 1 and the first and second release films 21 and 31, and at least one may be reciprocated in the vertical direction.

For example, the upper and lower bonding rolls 40 and 50 are installed to be reciprocated in the vertical direction at the upper side and lower sides of the progressing path of the polymer electrolyte membrane 1 and the first and second release films 21 and 31.

That is, to press the first and second release films 21 and 31 positioned at the upper side and the lower side via the polymer electrolyte membrane 1, the upper bonding roll 40 moves in the lower direction, and the lower bonding roll 50 moves in the upper direction.

Also, to release the pressure for the first and second release films 21 and 31 positioned at the upper side and the lower side via the polymer electrolyte membrane 1, the upper bonding roll 40 may moves in the upper direction, and the lower bonding roll 50 may move in the lower direction.

Here, the upper and lower bonding rolls 40 and 50 may be installed to be reciprocated in the vertical direction by operation sources 41 and 51, and the operation sources 41 and 51 are respectively connected to the upper and lower bonding roll 40 and 50 and may include an operation cylinder or a servo linear motor providing an operation force of the vertical direction to the upper and lower bonding rolls 40 and 50.

Also, the upper and lower bonding rolls 40 and 50 are rotated in opposite directions to each other and are provided as a bonding roller pressing the first and second release films 21 and 31 positioned at the upper side and lower side with the polymer electrolyte membrane 1 interposed therebetween.

The protection film unwinders 60 and 90 include a first protection film unwinder 60 and a second protection film unwinder 90.

The first protection film unwinder 60 may unwind and supply the first protection film 61 between the first release film 21 and the upper bonding roll 40.

Also, the second protection film unwinder 90 may unwind and supply the second protection film 91 between the second release film 31 and the lower bonding roll 50.

The first and second protection films 61 and 91 are configured to uniformly disperse the pressure of the upper and lower bonding rolls 40 and 50 to the first and second release film 21 and 31 and to reduce the pressure by the upper and lower bonding rolls 40 and 50. The first and second protection films 61 and 91 may include at least one among polytetra fluoroethylene (PTFE), polyethyleneterephthalate (PET), polyimide (PI), polyethylene naphthalate (PEN), and silicon.

Also, for the first and second protection films 61 and 91, a glass fiber may be included in at least one among polytetra fluoroethylene (PTFE), polyethyleneterephthalate (PET), polyimide (PI), polyethylene naphthalate (PEN), and silicon.

In this case, the glass fiber may be included in a state coated to the first and second protection films 61 and 91 and an additive shape.

The thickness of the first and second protection films 61 and 91 may have a range of about 100 to about 1000 μm (microns).

When the thickness of the first and second protection films 61 and 91 is less than about 100 microns, the effect as the protection film is slight, when the thickness is over about 1000 microns, the flexibility is decreased such that the process property on the process characteristic for the roll winding may be decreased.

More preferably, the thickness of the first and second protection films 61 and 91 may have the range of about 100 to about 300 microns, in this case, if the thickness of the first and second protection films 61 and 91 has the range less than 300 microns, the flexibility reduction is minimize such that the process characteristic may be further increased.

This is the reason that the pressure may be not normally transmitted when the protection films 61 and 91 are very thick, and the function of the protection films 61 and 91 for the uniform dispersion of the pressure may be not normal when the thickness is very thin.

When the first and second protection films 61 and 91 are omitted, the twist of the flat and axis of the upper and lower bonding rolls 40 and 50 in the roll laminating process is affected such that the pressure may be concentrated at the position of the first and second release films 21 and 31, and an imbalance of the pressure dispersion may cause the failure of the electrode assembly 7.

Also, in the roll laminating process, when excessive pressure is applied to the first and second release films 21 and 31 by the upper and lower bonding rolls 40 and 50, the pore dispersion of the catalyst electrode layers 3 and 5 may be non-uniform.

Accordingly, as the manufacturing device 100 of the membrane-electrode assembly for the fuel cell according to the present exemplary embodiment adds the protection films 61 and 91 between the bonding rolls 40 and 50 and the release films 21 and 31, the gap between the bonding rolls 40 and 50 and the release films 21 and 31 that may cause the flat imbalance and the axis twist of the upper and lower bonding rolls 40 and 50 may be filled, thereby uniformly dispersing the pressure.

Also, by disposing the protection films 61 and 91, it is not necessary to apply the high pressure more than the requirement to the bonding rolls 40 and 50, the bonding pressure may be lower such that the catalyst electrode layers 3 and 5 having the uniform pore distribution may be formed.

Next, in the present exemplary embodiment, the release bars 70 and 80 will be described, where the release bars 70 and 80 include a first release bar 70 and a second release bar 80 as a delamination bar.

The release bars 70 and 80 are disposed at an exit side of the upper and lower bonding rolls 40 and 50 to peel the first and second release films 21 and 31 after the catalyst electrode layers 3 and 5 are bonded to the polymer electrolyte membrane 1.

The first and second release bars 70 and 80 are installed at the upper and lower sides of the progressing path of the polymer electrolyte membrane 1, and the first and second release films 21 and 31 at the entry side of the upper and lower bonding rolls 40 and 50 and are closer to the upper and lower bonding rolls 40 and 50.

That is, the first release bar 70 is disposed closely to the upper bonding roll 40, and the second release bar 80 is disposed closely to the lower bonding roll 50.

The first and second release films 21 and 31 removed by the first and second release bars 70 and 80 are respectively rolled to the first and second film rewinders 75 and 85 to be recovered such that a rewinding speed of the first and second release films 21 and 31 may be determined by a driving torque provided to the first and second film rewinders 75 and 85.

Hereinafter, a manufacturing method of the membrane-electrode assembly for the fuel cell according to an exemplary embodiment of the present disclosure will be described.

First, in the manufacturing method of the membrane-electrode assembly according to an exemplary embodiment of the present disclosure, the polymer electrolyte membrane 1 rolled in the roll shape is unwound through the membrane unwinder 10 to be supplied to the predetermined progressing path.

Simultaneously, the first release film 21 rolled through the first film unwinder 20 in the roll shape is unwound and supplied in the upper side of the polymer electrolyte membrane 1 along the progressing path, and the second release film 31 rolled in the roll shape through the second film unwinder 30 is unwound and supplied in the lower side of the polymer electrolyte membrane 1 along the progressing path.

Here, the first release film 21 in the state that the anode catalyst electrode layer 3 is coated on the lower surface may be supplied along the progressing path while the anode catalyst electrode layer 3 faces the upper surface of the polymer electrolyte membrane 1, and the second release film 31 in the state that the cathode catalyst electrode layer 5 is coated on the upper surface may be supplied along the progressing path while the cathode catalyst electrode layer 5 faces the lower surface of the polymer electrolyte membrane 1.

Also, simultaneously, the first protection film 61 rolled in the roll shape through the first protection film unwinder 60 is unwound and supplied in the upper side of the first release film 21 along the progressing path, and the second protection film 91 rolled in the roll shape through the second protection film unwinder 90 is unwound and supplied in the lower side of the second release film 31 along the progressing path.

The gap between the bonding rolls 40 and 50 and the release films 21 and 31 that may be generated by the flat imbalance and the axis twist of the bonding rolls 40 and 50 is filled by the first and second protection films 61 and 91 disposed between the first and second release films 21 and 31 and the upper and lower bonding rolls 40 and 50, thereby uniformly dispersing the pressure.

The upper and lower bonding rolls 40 and 50 according to an exemplary embodiment of the present disclosure move in the upper and lower directions by the operation sources 41 and 51 at the timing that the polymer electrolyte membrane 1 and the catalyst electrode layers 3 and 5 of the first and second release films 21 and 31 enter therebetween, rotate in the opposite directions to each other, and press the polymer electrolyte membrane 1, the first and second release films 21 and 31, and the first and second protection films 61 and 91.

As described above, the catalyst electrode layers 3 and 5 coated to the first and second release films 21 and 31 may be transferred and bonded on the upper and lower surfaces of the polymer electrolyte membrane 1 by the pressure of the upper and lower bonding rolls 40 and 50.

On the other hand, the first and second release films 21 and 31 may be simultaneously peeled by the first and second release bar 70 and 80 and may be rolled to the first and second film rewinders 75 and 85 along with the process transferring and bonding the catalyst electrode layers 3 and 5 on the upper and lower surface of the polymer electrolyte membrane 1 while the catalyst electrode layers 3 and 5 of the first and second release film 21 and 31 via the polymer electrolyte membrane 1 are entered between the upper and lower bonding rolls 40 and 50, Also, the first and second protections film 61 and 91 may be rolled to the first and second protection film rewinders 65 and 95.

Hereinafter, a surface pressure of the manufacturing device of the membrane-electrode assembly according to an exemplary embodiment of the present disclosure will be described with reference to FIG. 3.

FIG. 3 is a view showing a result measuring a surface pressure applied to a membrane-electrode assembly in a manufacturing device of a membrane-electrode assembly for a fuel cell according to a comparative example and an exemplary embodiment of the present disclosure.

First, as an exemplary embodiment of the present disclosure, a 100 micron (μm) PET, a 250 μm PET, and a 100 μm PTFE are respectively applied as the protection film to execute the roll laminating process, and the roll laminating process without the application of the protection film is executed as a comparative example.

Also, the roll laminating process is executed under 80 kgf of a bonding weight of the bonding roll.

As shown in FIG. 3, in the case of the comparative example, the applied pressure (transfer pressure) is 13.75 MPa, however it is confirmed that the applied pressure is 11.34 MPa when the 100 μm PET is applied as the protection film, the applied pressure is 9.34 MPa when the 250 μm PET is applied as the protection film, and the applied pressure is 7.78 MPa when the 100 μm PTFE is applied as the protection film.

That is, it may be confirmed that the transfer pressure is decreased in the case of the exemplary embodiment compared with the comparative example.

Also, a pressure deviation is 8.61 MPa in the case of the comparative example, however it is confirmed that the pressure deviation is 6.59 MPa when the 100 μm PET is applied as the protection film, the pressure deviation is 5.512 Pa when the 250 μm PET is applied as the protection film, and the pressure deviation is 4.52 MPa when the 100 μm PTFE is applied as the protection film.

That is, it may be confirmed that the pressure deviation is decreased in the case of the exemplary embodiment compared with the comparative example.

That is, in the case of the exemplary embodiment applied with the protection film, compared with the comparative example without the application of the protection film, it may be confirmed that the transfer pressure is decreased and the pressure is uniformly applied.

Next, an experiment result for a transfer decree of a catalyst electrode layer according to a manufacturing process of the membrane-electrode assembly according to an exemplary embodiment of the present disclosure will be described with reference to FIG. 4.

Figure 4:
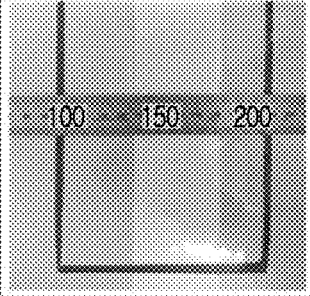
FIG. 4 is a photograph of a recovered release film after manufacturing a membrane-electrode assembly by using a manufacturing device of a membrane-electrode assembly for a fuel cell according to a comparative example and an exemplary embodiment of the present disclosure.

FIG. 4 is a photograph of a recovered release film after manufacturing a membrane-electrode assembly by using a manufacturing device of a membrane-electrode assembly for a fuel cell according to a comparative example and an exemplary embodiment of the present disclosure.

An exemplary embodiment of the present disclosure and a comparative example are executed in the same manner as FIG. 3 except for dividing the bonding weight into 60 kgf and 80 kgf.

As shown in FIG. 4, it may be confirmed that the catalyst electrode layer remains on the recovered release film after executing the process according to the comparative example as compared to the recovered release film after performing the process according to the exemplary embodiment.

That is, in the case of the comparative example, it may be confirmed that the catalyst electrode layer is not entirely transferred to the polymer electrolyte membrane, but a part thereof remains on the release film, and thus the pressure by the bonding roll is not uniformly applied.

Next, a pore characteristic of the membrane-electrode assembly manufactured by the manufacturing method according to an exemplary embodiment of the present disclosure will be described with reference to FIG. 5 and FIG. 6.

Figure 5:
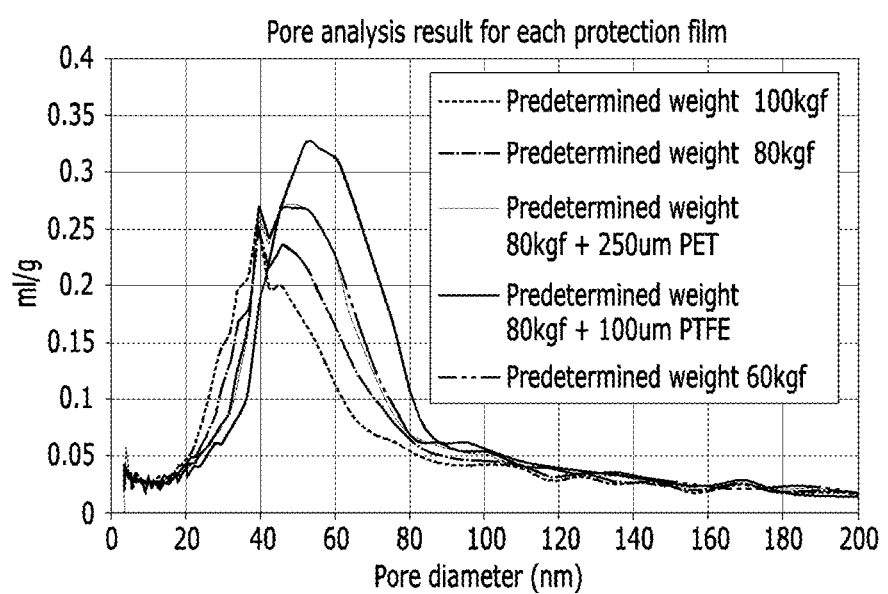
FIG. 5 is a graph showing a result analyzing a pore characteristic of a membrane-electrode assembly manufactured by using a manufacturing device of a membrane-electrode assembly for a fuel cell according to a comparative example and an exemplary embodiment of the present disclosure.
Figure 6:
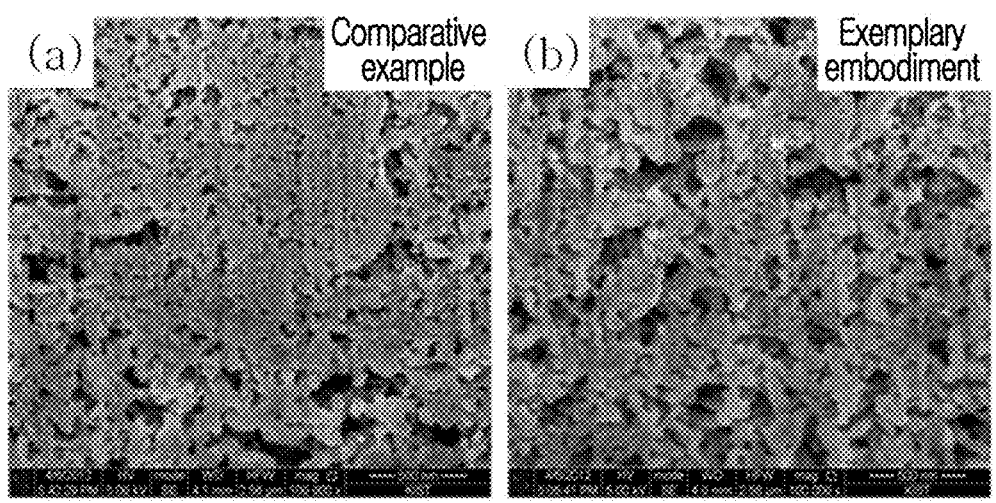
FIG. 6 is a photograph of a pore of a membrane-electrode assembly manufactured by using a manufacturing device of a membrane-electrode assembly for a fuel cell according to a comparative example and an exemplary embodiment of the present disclosure.

FIG. 5 is a graph showing a result analyzing a pore characteristic of a membrane-electrode assembly manufactured by using a manufacturing device of a membrane-electrode assembly for a fuel cell according to a comparative example and an exemplary embodiment of the present disclosure, and FIG. 6 is a photograph of a pore of a membrane-electrode assembly manufactured by using a manufacturing device of a membrane-electrode assembly for a fuel cell according to a comparative example and an exemplary embodiment of the present disclosure.

First, referring to FIG. 5, a horizontal axis represents a diameter of a pore, and a vertical axis represents a porosity.

Here, the porosity is measured by using a mercury absorption.

As shown in FIG. 5, it may be confirmed that the diameter of the pore is decreased and the porosity is slightly decreased as the bonding weight of the bonding roll is increased, in contrast, it may be confirmed that the pore size is increased and the porosity is increased as the bonding weight is decreased.

Also, an exemplary embodiment of the present disclosure executing the roll laminating process by including the protection film has the similar porosity and pore size even though the predetermined weight 80 kgf is applied to the case of the comparative example executing the roll laminating process while applying the predetermined weight 60 kgf without the protection film.

That is, it may be confirmed that the porosity and the pore size are excellent in the case of the exemplary embodiment executing the process including the protection film compared with the comparative example.

Also, referring to FIG. 6, compared with the comparative example, it may be directly confirmed that the pore diameter of the membrane-electrode assembly according to the exemplary embodiment is largely formed.

As described above, as the manufacturing device and the manufacturing method of the membrane-electrode assembly for the fuel cell according to an exemplary embodiment of the present disclosure add the protection film between the bonding rolls to execute the roll laminating continuous process, the uniform performance may manufacture the excellent membrane-electrode assembly of the fuel cell.

Also, when maintaining the thickness of the roll, the catalyst loading amount and a contact area (time) may be increased such that the sufficient filter performance and catalyst performance may be obtained.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing device of a membrane-electrode assembly for a fuel cell comprising:
    a membrane unwinder unwinding and supplying a polymer electrolyte membrane of a roll shape;
    a film unwinder unwinding and supplying a release film of a roll shape respectively coated with an anode catalyst electrode layer and a cathode catalyst electrode layer with a predetermined interval in upper and lower sides of the polymer electrolyte membrane;
    upper and lower bonding rolls respectively disposed at the upper and lower sides of a progressing path of the polymer electrolyte membrane and the release film and pressed to an upper surface and a lower surface of the polymer electrolyte membrane;
    a protection film unwinder unwinding and supplying a protection film between adhered surfaces of the release film and the upper and lower bonding rolls in a different path from the release film;
    a film rewinder rolling the release film unrolled from the film unwinder; and
    a protection film rewinder rolling the protection film unrolled from the protection film unwinder in a different path from the release film;
    wherein, the film unwinder includes a first film unwinder positioned on the polymer electrolyte membrane and unwinding and supplying a first release film and a second film unwinder positioned under the polymer electrolyte membrane and unwinding and supplying a second release film,
    wherein, the protection film unwinder includes a first protection film unwinder positioned on the polymer electrolyte membrane and unwinding and supplying a first protection film and a second protection film unwinder positioned under the polymer electrolyte membrane and unwinding and supplying a second protection film,
    wherein, the film rewinder includes a first film rewinder positioned on the polymer electrolyte membrane and rolling the first release film and a second film rewinder positioned under the polymer electrolyte membrane and rolling the second release film, and
    wherein, the protection film rewinder includes a first protection film rewinder positioned on the polymer electrolyte membrane and rolling the first protection film and a second protection film rewinder positioned under the polymer electrolyte membrane and rolling the second protection film.

2. The manufacturing device of claim 1, further comprising:
    a release bar disposed at an exit side of the upper and lower bonding rolls and peeling the release film.

3. The manufacturing device of claim 1, further comprising:
    a membrane rewinder rolling the polymer electrolyte membrane unrolled from the membrane unwinder to be recovered.

4. The manufacturing device of claim 1, wherein:
    the protection film includes at least one of: polytetra fluoroethylene (PTFE), polyethyleneterephthalate (PET), polyimide (PI), polyethylene naphthalate (PEN), and silicon.

5. The manufacturing device of claim 4, wherein:
    the protection film includes a glass fiber.

6. The manufacturing device of claim 5, wherein:
    the glass fiber is coated to the protection film.

7. The manufacturing device of claim 5, wherein:
    the glass fiber is included in the protection film as an additive.

8. The manufacturing device of claim 5, wherein:
    the thickness of the protection film is about 100 to about 1000 microns.

9. The manufacturing device of claim 8, wherein:
    the thickness of the protection film is about 100 to about 300 microns.

10. A manufacturing method of the membrane-electrode assembly for a fuel cell comprising:
    unwinding, by a membrane unwinder, a polymer electrolyte membrane to be supplied to a progressing path;
    unwinding, by a first film unwinder positioned on the polymer electrolyte membrane and a second film unwinder positioned under the polymer electrolyte membrane, a release film coated with an anode catalyst electrode layer and a cathode catalyst electrode layer with a predetermined interval, the release film being unwound to upper and lower sides of the polymer electrolyte membrane to be supplied at the same time with the supply of the polymer electrolyte membrane;
    unwinding, by a first protection film unwinder positioned on the polymer electrolyte membrane and a second protection film unwinder positioned under the polymer electrolyte membrane, a protection film to the surface of the release film in a different path from the release film at the same time with the supply of the polymer electrolyte membrane and the release film; and
    pressing the release film and the protection film disposed via the polymer electrolyte membrane by using upper and lower bonding rolls to transfer and bond the anode catalyst electrode layer and the cathode catalyst electrode layer to the polymer electrolyte membrane;
    rolling and recovering the release film by using a first film rewinder positioned on the polymer electrolyte membrane and a second film rewinder positioned under the polymer electrolyte membrane; and
    rolling and recovering the protection film in a different path from the release film by using a first protection film rewinder positioned on the polymer electrolyte membrane and a second protection film rewinder positioned under the polymer electrolyte membrane.

11. The manufacturing method of claim 10, further comprising:

after transferring and bonding the anode catalyst electrode layer and the cathode catalyst electrode layer to the polymer electrolyte membrane, peeling the release film at an exit side of the upper and lower bonding roll by using a release bar.

12. The manufacturing method of claim 11, wherein:

after peeling the release film, rolling the polymer electrolyte membrane bonded with the anode catalyst electrode layer and the cathode catalyst electrode layer to be recovered by using a membrane rewinder.

13. The manufacturing method of claim 10, wherein:

the protection film includes at least one of: polytetrafluoroethylene (PTFE), polyethyleneterephtalate (PET), polyimide (PI), polyethylene naphthalate (PEN), and silicon (silicon).

14. The manufacturing method of claim 13, wherein:

the protection film includes a glass fiber.

15. The manufacturing method of claim 14, wherein:

the glass fiber is coated to the protection film or is included as an additive.

16. The manufacturing method of claim 13, wherein:

the thickness of the protection film is about 100 to about 1000 microns.

17. The manufacturing method of claim 16, wherein:

the thickness of the protection film is about 100 to about 300 microns.

* * * * *